Jan. 22, 1974 D. J. DAVIS Re. 27,891

INDUCTOR COIL

Original Filed Jan. 21, 1969 2 Sheets-Sheet 1

INVENTOR
Dhu Aine J. Davis

BY Hofgren, Wegner, Allen, Stellman & McCord
ATTORNEYS

United States Patent Office

Re. 27,891
Reissued Jan. 22, 1974

27,891

INDUCTOR COIL

Dhu Aine J. Davis, Wheaton, Ill., assignor to Hermetic Coil Co., Inc.

Original No. 3,544,940, dated Dec. 1, 1970, Ser. No. 792,721, Jan. 21, 1969. Application for reissue July 13, 1971, Ser. No. 162,127
Int. Cl. H01f *15/10*
U.S. Cl. 336—192 6 Claims

Matter enclosed in heavy brackets [ ] appears in the original patent but forms no part of this reissue specification; matter printed in italics indicates the additions made by reissue.

ABSTRACT OF THE DISCLOSURE

An electrical coil which has a bobbin configuration with a coil receiving central portion and a pair of end discs at the ends of the central portion defining a channel. A plurality of slots are formed in one of the end discs for receiving terminal leads which have exposed conductor portions for connection to end wires from a coil wound on the central portion of the bobbin. Each of the slots has openings at opposite ends so that a terminal lead may be inserted into one end of the slot with the exposed conductor portion protruding from the opposite end of the slot for connection to one of the coil end wires.

SUMMARY OF THE INVENTION

This invention is concerned primarily with electrical coils of many turns of very fine wire wound on a spool-like bobbin of a molded plastic insulating material. The inner end of the wire, that is the end adjacent the core or central portion of the bobbin, and the outer end of the wire extending from the last turn of the coil are connected to exposed conductor portions of terminal leads through which the electrical coil is connected in a circuit. The fine wire from which many coils are wound is extremely difficult to manipulate and connect to terminals.

Therefore, an object of this invention is to provide an improved electrical coil which is simple and easy to manufacture and provides for easy manipulation of the winding end wires for connection to terminal leads.

Another object of this invention is to provide an improved electrical coil construction having a coil wound on a bobbin form, with terminal leads positioned in and extending entirely through slots in one of the end discs of the bobbin with exposed conductor portions of the terminal leads protruding from the slots and in position for easy connection to the winding end wires of the wound coil.

A further object of this invention is to provide an electrical coil as set forth in the preceding paragraph wherein open ends of the slots are disposed at the peripheral edge of one of the end discs of the bobbin whereby the terminal leads extend away from the peripheral edge of the end disc and the exposed conductor portions of the terminal leads also protrude from the peripheral edge of the end disc for connection to the winding end wires.

In another form of the invention one end of each of the slots opens at the inner face of the end disc of the bobbin outwardly from the wound coil whereby the exposed conductor portions of the terminal leads protrude inwardly over the wound coil for connection with the winding end wires.

Other objects and features of the invention will be apparent from the following detailed description taken in connection with the accompanying drawings.

DESCRIPTION OF THE DRAWINGS

FIG. 4 is a perspective view of a second form of the invention with a coil wound on the bobbin, terminal leads positioned on the bobbin and the winding end wires connected thereto;

DETAILED DESCRIPTION OF THE INVENTION

The electrical coil embodying the invention illustrated herein is epecially designed to facilitate manipulation and positioning of terminal leads for connection to end wires extending outwardly from a coil wound on a bobbin form so that the entire coil may be easily handled for subsequent operations, as for encapsulation. The reference to encapsulation is made for illustration purposes only.

Figure 1:
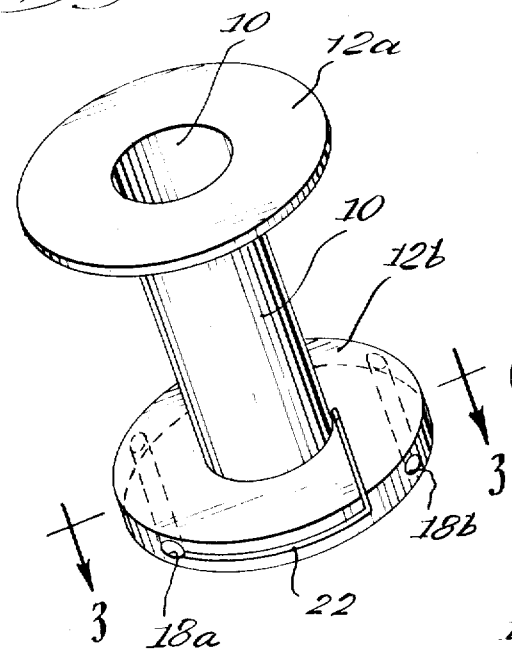
FIG. 1 is a perspective view of a bobbin, embodying one form of the invention, before a coil is wound thereon and before terminal leads are positioned thereon.
Figure 2:
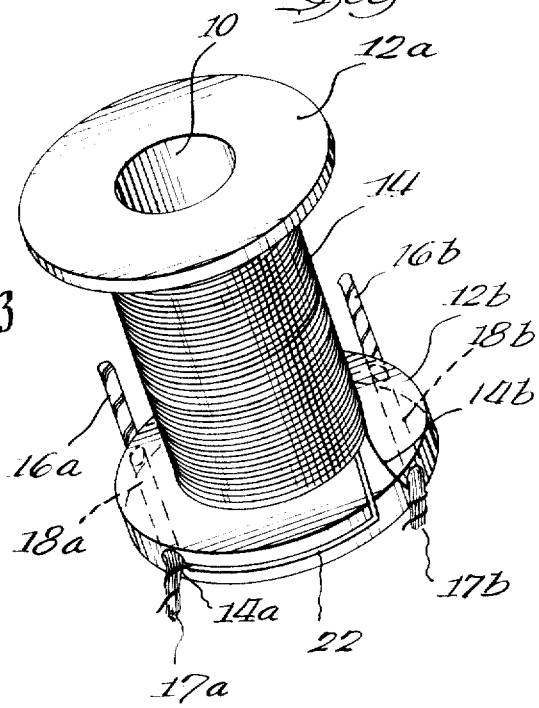
FIG. 2 is a perspective view similar to that of FIG. 1 with a coil wound on the bobbin, terminal leads positioned on the bobbin and the winding end wires connected thereto.
Figure 3:
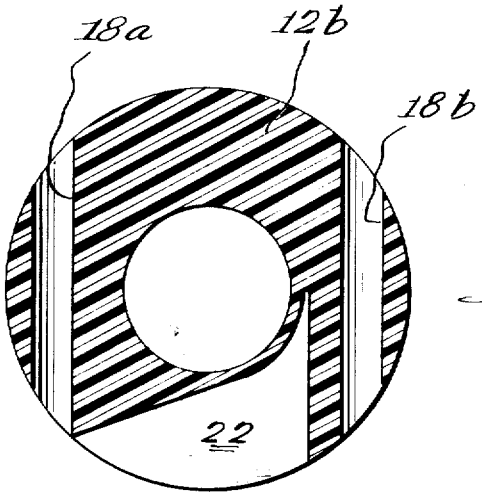
FIG. 3 is a section through one end disc of the bobbin taken generally along the line 3—3 of FIG. 1.

Turning now to the drawings, a first form of the invention is shown in FIGS. 1 through 3 in which a bobbin has a coil receiving central portion 10 (FIG. 1) with a pair of generally parallel end discs 12a, 12b at opposite ends, defining a coil receiving channel. A coil 14 (FIG. 2) is wound on the central portion of the bobbin within the channel and has end wires 14a, 14b for connection to terminals leads 16a, 16b, respectively.

In the improved bobbin construction of the present invention, end disc 12b is slightly thicker than end disc 12a and has a pair of slots 18a, 18b spaced from the coil receiving central portion 10 and extending entirely through the end disc 12b generally in the plane of the disc whereby the opposite ends of the slots 18a, 18b open on the peripheral edge of the disc, as best seen in FIG. 3. These slots receive the terminal leads 16a, 16b in a manner shown in FIG. 2 whereby the terminal leads are inserted into one end of the slots and pushed through the slot until the exposed conductor portions 17a, 17b of the terminal leads protrude from the opposite ends of the slots on the peripheral edge of the end disc 12b. In this manner, the exposed conductor portions 17a, 17b are positioned for easy connection to the winding end wires 14a, 14b, respectively, which extend outwardly from the wound coil 14. Preferably, the slots are of a size to permit the terminal leads to be pushed therethrough with ease, but sufficiently small in diameter to grip the terminal leads and prevent them from accidentally falling out of the slots.

The bobbin shown in FIGS. 1 through 3 has means for pre-positioning the inner end wire 14a for subsequent connection to the exposed portion 17a of the terminal lead 16a. An undercut pocket or groove 22 in the end disc 12b is formed generally tangential to the central portion 10 of the bobbin and extends to the peripheral edge of the end disc. The inner end wire 14b, that is, the end adjacent the bobbin central portion 10, is initially laid in pocket 22 and the coil is wound on the central portion 10. As seen in FIG. 2, the inner end 14b of the winding extends outwardly away from the channel and, being prepositioned in the undercut pocket 22, is readily accessible after the coil is wound, for subsequent manipulation and connection to the exposed portion 17a of terminal lead 16a. The outer end 14b of the wound coil, extending from the last turn of the coil, is wrapped around the exposed portion 17b of terminal lead 16b.

It should be understood that the slots 18a, 18b may be positioned at various angular directions through the end disc 12b, depending upon which direction it is desired that the terminal leads 16a, 16b extend away from the bobbin form. Obviously, in the form of the invention shown in FIGS. 1 through 3, it is preferred that the terminal leads extend from the bobbin generally in the plane of end disc 12b. The undercut pocket or groove 22 should be formed closely adjacent the slot which is to receive the terminal lead to be connected to the inner end wire 14b.

Figure 5:
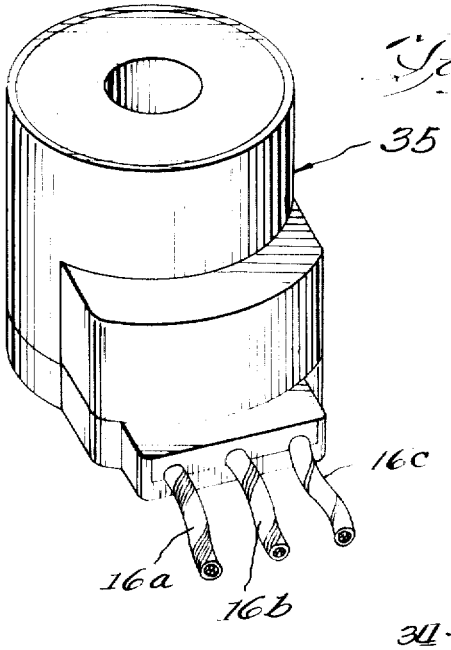
FIG. 5 is a perspective view of a completely assembled and encapsulated electrical coil embodying the form of the invention shown in FIG. 4.
Figure 11:
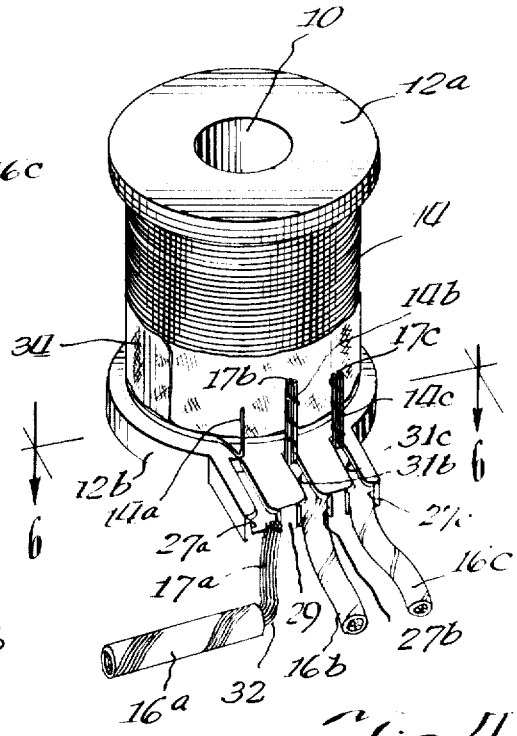
Figure 6:
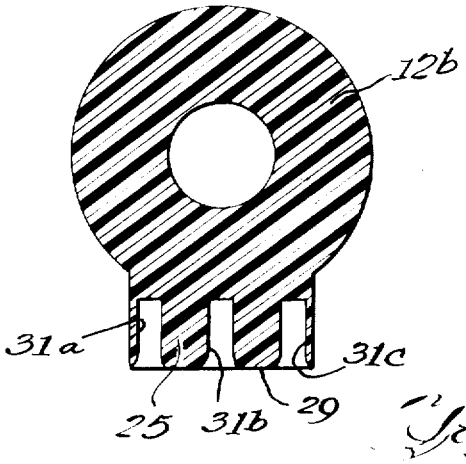
FIG. 6 is a section through one end disc of the bobbin form of FIG. 4 taken generally along the line 6—6 of FIG. 4.

A second form of the invention is shown in FIGS. 4 through 6 wherein like numerals are applied to similar parts previously described in relation to the form of the invention shown in FIGS. 1 through 3. In this form of the invention, three winding end wires 14a, 14b, 14c extend radially outwardly from the wound coil 14 on the coil receiving central portion 10 for connection to exposed conductor portions 17a, 17b, 17c of terminal leads 16a, 16b, 16c, respectively. The number of winding end wires is dependent upon the type of coil desired. Three winding end wires and terminal leads are shown in FIGS. 4–6 for illustration purposes only.

In the form of the invention shown in FIGS. 4 through 6, a boss 25 is molded integral with the end disc 12b of the bobbin and extends generally radially outwardly therefrom. Three slots 27a, 27b, 27c are formed in the boss 25 generally in the plane of the end disc 12b and opening at one end at the outermost edge 29 of the boss 25. Grooves 31a, 31b, 31c extend the entire length of the slots 27a, 27b, 27c and face inwardly toward the opposite end disc 12a over the bobbin central portion 10 above the wound coil 14. Before inserting the terminal leads 16a–16c into the slots 27a–27c, the exposed conductor portions 17a–17c of the terminal leads are bent generally at a right angle to the remainder of the terminal leads, as shown in FIG. 4, forming a shoulder 32. The terminal leads then can be inserted into the slots, shoulder first, and with the exposed conductor portions protruding through the grooves 31a–31c of the slots. The terminal leads are pushed until the shoulders seat onto the bottom of the slots with the conductor portions protruding inwardly over the wound coil 14. After the terminal leads are positioned in the respective slots 27a–27c in the boss portion 25 of end disc 12b, the end wires 14a–14c are wrapped around the inwardly protruding conductor portions 17a–17c of the terminal leads. An insulating tape 34 may be wrapped around the wound coil between the conductor portions 17a–17c and the coil. The winding end wires 14–14c are soldered or welded to the conductor portions of the terminal leads and the coil is ready for encapsulation by a plastic insulating material, generally designated 35 (FIG. 5).

The assembled coil shown in FIG. 2 may be encapsulated with a similar plastic insulating material.

The foregoing detailed description has been given for clearness of understanding only and no unnecessary limitations should be understood therefrom as some modifications will be obvious to those skilled in the art.

I claim:

[1. In an electrical coil having a bobbin configuration with a coil receiving central portion and a pair of end discs at the ends of the central portion defining a channel, said end discs having peripheral edges, a coil wound on the central portion of said coil form within said channel and having end wires for connection to exposed conductor portions of appropriate terminal leads, the improvement comprising a slot in at least one of said end discs receiving one of said terminal leads, said slot extending in the general plane of the disc and in a non-radial direction and having a pair of openings whereby said one terminal lead inserted into one of the openings of said slot has an exposed conductor portion of said one terminal lead protruding from the other opening of the slot connected to one of said coil end wires.]

[2. The electrical coil of claim 1 wherein said one end disc is generally planar and the opening of said slot into which said one terminal lead is inserted is disposed at the peripheral edge of said one end disc whereby said one terminal lead extends in a non-radial direction from said one end disc in the general plane of the end disc.]

[3. The electrical coil of claim 1 wherein said one end disc is generally planar with said slot extending entirely therethrough generally in the plane thereof and with openings at opposite ends of the slot being disposed at the peripheral edge of said one end disc.]

[4. The electrical coil of claim 3 including a groove in the inner face of said one end disc receiving one of said coil end wires, said groove extending radially outwardly from the central portion of said coil to a point closely adjacent the opening at the end of said slot from which the exposed conductor portion of said one terminal lead protrudes, to position said one winding end wire for subsequent connection with the exposed conductor portion of the terminal lead in said slot.]

5. In an electrical coil having a bobbin configuration with a coil receiving central portion and a pair of end discs at the ends of the central portion defining a channel, said end discs having peripheral edges, a coil wound on the central portion of said [coil form] *bobbin* within said channel and having end wires for connection to exposed conductor portions of appropriate terminal leads, the improvement comprising, a portion of at least one of said discs extending outward beyond said wound coil with at least one slot in the general plane of said disc, said slot extending along the length of said extending portion and having one end opening at the outermost peripheral edge of said extending portion and facing outward from said central portion, a groove in said end disc extending the entire length of the slot and of such a depth as to form an opening in said slot, facing inwardly toward the opposite end disc, a terminal lead in said slot and having an exposed conductor portion extending inwardly through said groove opening, toward the opposite end disc and connected with one of the coil end wires.

6. The electrical coil of claim 5, wherein the slot has an inner end surface and the exposed conductor portion of a terminal lead extends at an angle to the remainder of the terminal lead, forming a shoulder and the terminal lead is located in the slot with said shoulder seated against said end surface and with the exposed conductor portion extending inwardly toward the opposite disc through said groove and over the wound coil, and the unexposed conductor portion of the terminal lead enclosed by the slot extends outward from the central receiving portion in the general plane of the end disc.

[7. The electrical coil of claim 3 wherein there are two of said slots in at least one of said end discs, said slots being parallel, and disposed at either side of said coil receiving central portion.]

8. The electrical coil of claim 5 wherein the width of said groove is less than the diameter of the unexposed portion of the terminal lead, but at least equal to the diameter of the exposed conductor portion of the terminal lead, whereby said exposed conductor portion extends through said opening but said unexposed portion is prevented from so extending by its greater diameter.

*9. In an electrical coil having a bobbin configuration with a coil receiving central portion and a pair of end discs at the end of the central portion defining a channel, said end discs having peripheral edges, a coil wound on the*

*central portion of said bobbin within said channel and having end wires for connection to exposed conductor portions of appropriate terminal leads, the improvement comprising a slot in at least one of said end discs receiving one of said terminal leads, said one end disc being generally planar with said slot extending entirely therethrough generally in the plane thereof and with openings at opposite ends of the slot disposed at the peripheral edge of said one end disc whereby one of said terminal leads inserted into one of the openings of said slot at the peripheral edge of said one end disc has an exposed conductor portion of said one terminal lead protruding from the other opening of the slot at the peripheral edge of said one end disc for connection to one of said coil end wires.*

*10. The electrical coil of claim 9 wherein there are two of said slots in at least one of said end discs, said slots being parallel and disposed at either side of said coil receiving portion, with one of said terminal leads inserted into one of the openings of each slot and having an exposed conductor portion protruding from the other opening of each slot for connection to the coil end wires.*

*11. The electrical coil of claim 9 including a groove in the inner face of said one end disc receiving one of*

*said coil end wires, said groove extending radially outwardly from the central portion of said coil to a point closely adjacent the opening at the end of said slot from which the exposed conductor portion of said one terminal leads protrudes, to position said one winding end wire for subsequent connection with the exposed conductor portion of the terminal lead in said slot.*

References Cited

The following references, cited by the Examiner, are of record in the patented file of this patent or the original patent.

UNITED STATES PATENTS

| | | | |
|---|---|---|---|
| 3,230,489 | 1/1966 | Weyrich | 336—192 |
| 3,517,365 | 6/1970 | Hilgers | 336—192 |

OTHER REFERENCES

Du Pont brochure Product Engineering, February 1955, zytel nylon resin, pp. 1 and 2.

ELLIOT A. GOLDBERG, Primary Examiner

U.S. Cl. X.R.

336—198, 208